United States Patent
Craik

[11] Patent Number: 6,099,233
[45] Date of Patent: Aug. 8, 2000

[54] RAMP FOR VEHICLES

[76] Inventor: Sidney W. Craik, 4 Algom Road, Elliot Lake, Canada, P5A 1J3

[21] Appl. No.: 09/438,790

[22] Filed: Nov. 12, 1999

[51] Int. Cl.⁷ .................................................. B65G 67/02
[52] U.S. Cl. ............................ 414/537; 14/71.1; 182/195
[58] Field of Search ...................... 414/537, 538; 296/61, 51, 62; 182/195, 196, 194, 197, 156; 193/6, 41; 14/69.5, 71.1, 72.5

[56] References Cited

U.S. PATENT DOCUMENTS

| | | |
|---|---|---|
| 4,290,728 | 9/1981 | Leduc ...................................... 414/537 |
| 4,527,941 | 7/1985 | Archer .................................... 414/537 |
| 4,571,144 | 2/1986 | Cruidry et al. ......................... 414/537 |
| 4,628,561 | 12/1986 | Kushiryk ............................ 414/537 X |
| 4,923,360 | 5/1990 | Beavehemin ........................... 414/537 |
| 5,077,852 | 1/1992 | Karlsson ............................ 414/537 X |
| 5,205,603 | 4/1993 | Burdette, Jr. ............................... 296/62 |

*Primary Examiner*—Frank E. Werner

[57] ABSTRACT

A ramp, for loading the box of a pick-up truck, has a pair of stringers and slidable rungs joined by lengths of chain. The stringers may be telescopically stored in storage tubes located on the box floor. The chains that join the rungs limit their separation when the ramp is extended. The stringers are tethered to the storage tubes when deployed and the storage tubes are optionally tethered to the truck box.

10 Claims, 4 Drawing Sheets

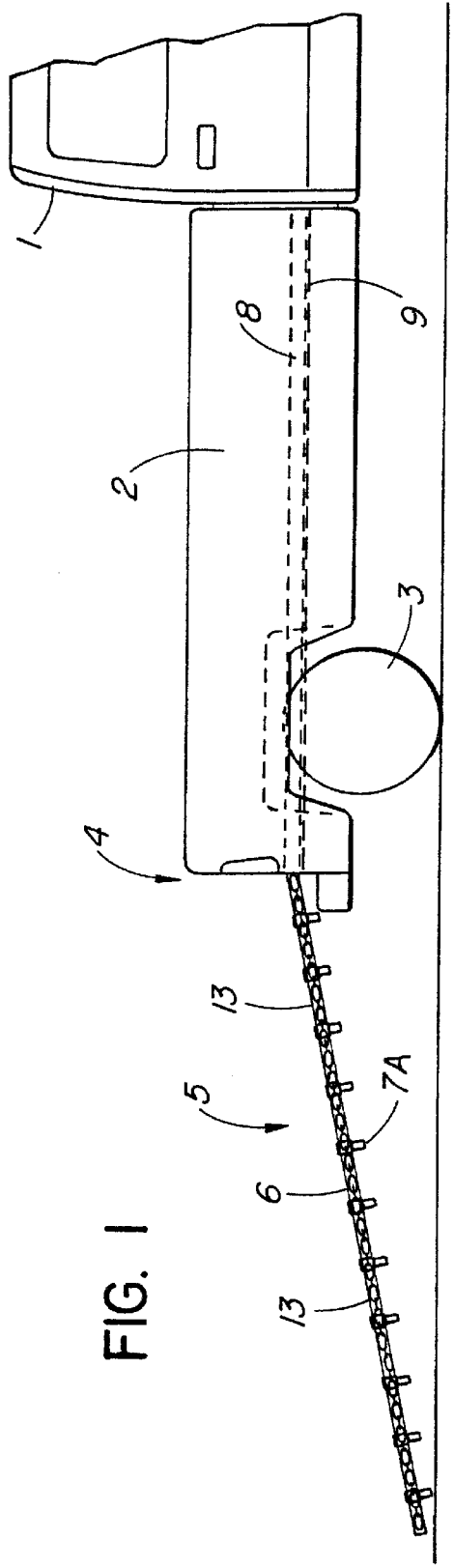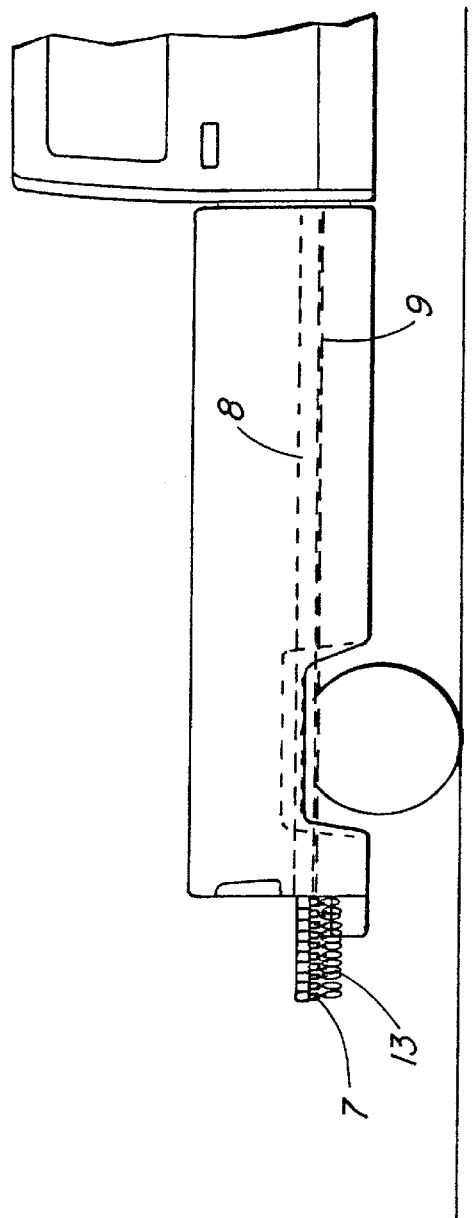

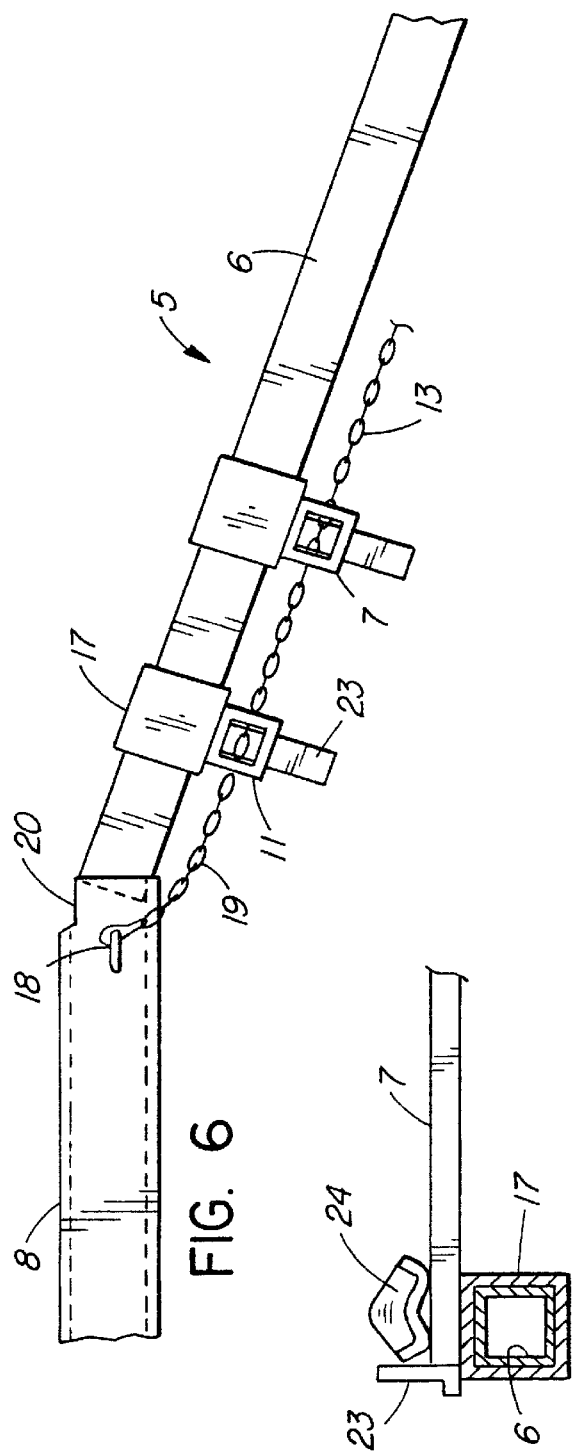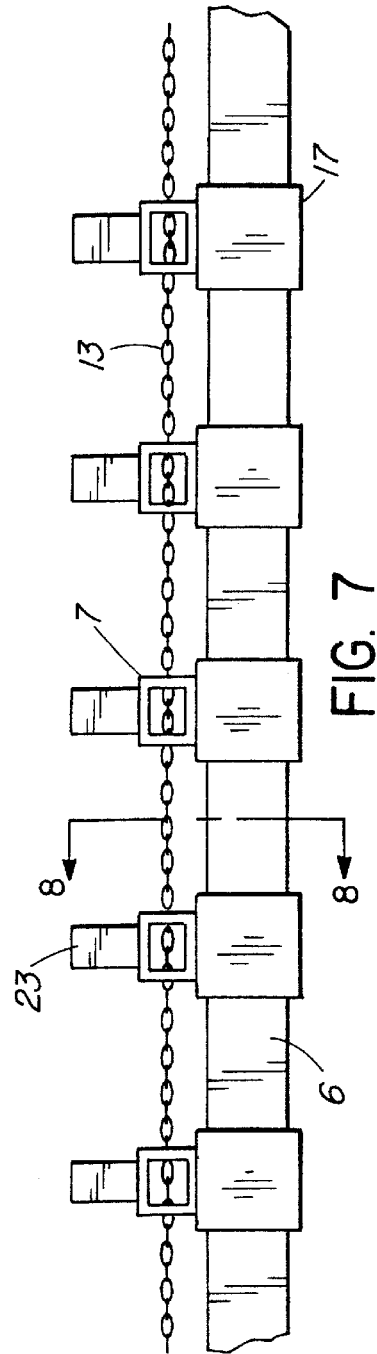

RAMP FOR VEHICLES

FIELD OF THE INVENTION

This invention relates to a ramp for loading a vehicle. More particularly it relates to a ramp for extending rearwardly from the box of a pick-up truck to allow the loading of cargo, such as a snowmobile, within the truck box.

BACKGROUND TO THE INVENTION

Numerous proposals have been made for ramps that may extend outwardly from the tailgate of a pick-up truck. U.S. pat. Nos. 4,628,561; 4,144,335; 5,312,149; and 5,536,058 all describe telescopically collapsible ramps. Examples of foldable ramps are U.S. Pat. 3,6741,156, 4,517,941 and 4,864,673.

To effect storage of the ramp after the vehicle is loaded, it has been proposed to provide the pick-up truck box with a second, elevated floor so that the entire ramp may be slid into the space beneath this floor.

Generally, these ramps have a pair of outside stringers with rungs extending therebetween. In many cases the rungs are fixed to the risers. In U.S. Pat. No. 4,290,728 the rungs are free to slide along the risers, being linked when deployed by lengths of chain that cause them to be evenly spaced along the length of the ramp. In this latter case the ramp is stored by assembling the rungs as a bundle at the tailgate end of the truck box and the risers are slid separately into the truck box on either side of the load. Thus, the ramp is not stored in a readily deployable format.

It is desirable to provide a loading ramp for a vehicle that is low in cost to manufacture, may be readily deployed and may be stored conveniently in the cargo area of the vehicle which the ramp serves. This invention addresses those objectives.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect, the invention comprises a ramp system for a vehicle having a load box positioned over the rear wheels of the vehicle, such ramp system comprising:

(1) a ramp having two stringers with forward and rearward end portions and multiple transverse rungs, extending between the stringers and slidably coupled thereto;

(2) lengths of chain extending between the rungs to limit their inter-rungs spacing when the rungs are separated to provide a ladder-like configuration;

(3) twin storage tubes for telescopically receiving the respective stringers of the ramp, such tubes being dimensioned to fit longitudinally along the length of a vehicle load box;

(4) storage tube separation means for fixing the distance between the twin storage tubes within the vehicle box; and (5) anchor means for limiting the extension of the rungs with respect to the storage tubes;

wherein, upon the telescopic insertion of the forward end portions of the stringers into the respective storage tubes, with the rearward end portions protruding, the rungs may be slid together for compact storage between the rearward end portions of the stringers that remain protruding from the storage tubes.

According to a preferred feature of the invention, the outermost rung with respect to the vehicle box is fixed with respect to the stringers and the anchor means comprises anchor chain coupling means extending between the innermost rung and at least one of the storage tubes to limit the telescopic extension of the ramp from the storage tubes.

It is desirable that the stringers may be telescopically extended from the storage tubes until the stringers are able to be angled-downwardly from such tubes, but without being fully removed therefrom rather than resting, separated from the tubes, on the vehicle box. To facilitate this arrangement a relief opening may be provided on the top side of the storage tubes at the forward ends where the stringers are to angle downwardly.

As a further preferred feature, the rungs may all lie on the same side of the two stringers, and each rung may overlie and extend beyond the sides of the stringers on both sides of the ramp, such rungs being coupled to the stringers so as to allow the ramp to be inverted, permitting either the stringers or rungs to be presented on the upper-most, top-side of the ramp.

Additionally, the rungs may carry vertically protruding flanges at their outermost ends, extending away from the stringers, to provide guides for cargo being carried up the ramp when the rungs are presented as the uppermost portion of the ramp.

As a further feature, the rungs may be covered, at least in part, by rotatable cylindrical sleeves to reduce wear on the rungs from abrasion, as by the skiis of a snowmobile.

The storage tube separation means may comprise a pair of transverse straps extending between the storage tubes, such straps being preferably located on the sides of the storage tubes adjacent to the floor of the vehicle load box. Alternately, the tubes may be fastened to the box floor to maintain their separation. In such case, the box floor serves as the anchor means.

The ramp system of the invention may also include a centrally-located stopping means, providing transverse blocking extensions coupled to the storage tubes, the outer ends of the blocking extensions extending outwardly of the sides of the storage tubes sufficiently to fit against the front sides of wheel well covers present along the inner sides of the vehicle box. The function of the blocking extensions is to resist removal of the transverse tubes from the vehicle box. Preferably, these blocking extensions are part of a single transverse anchor strap. Preferably, this anchor strap is adjustably fixable in its position between the storage tubes.

The foregoing summarizes the principal features of the invention and some of its optional aspects. The invention may be further understood by the description of the preferred embodiments, in conjunction with the drawings, which now follow.

SUMMARY OF THE FIGURES

FIG. 1 is a side view of a vehicle cargo box with the ramp of the invention extending in its deployed position from the tailgate;

FIG. 2 is a side view as in FIG. 1 with the ramp stored within the cargo box;

FIG. 6 is a detailed side view of FIG. 1 taken from the reverse direction to the FIG. 2 with the rungs mounted below the stringers.

FIG. 7 is a close-up side view of the ramp with the rungs on the upperside of the stringers.

FIG. 8 is a detailed cross-sectional end view of the stringer of FIG. 7 taken at the rung intersection showing a snowmobile ski contained by an upwardly extending flange.

DESCRIPTION OF THE PREFERRED EMBODIMENT

Figure 3:
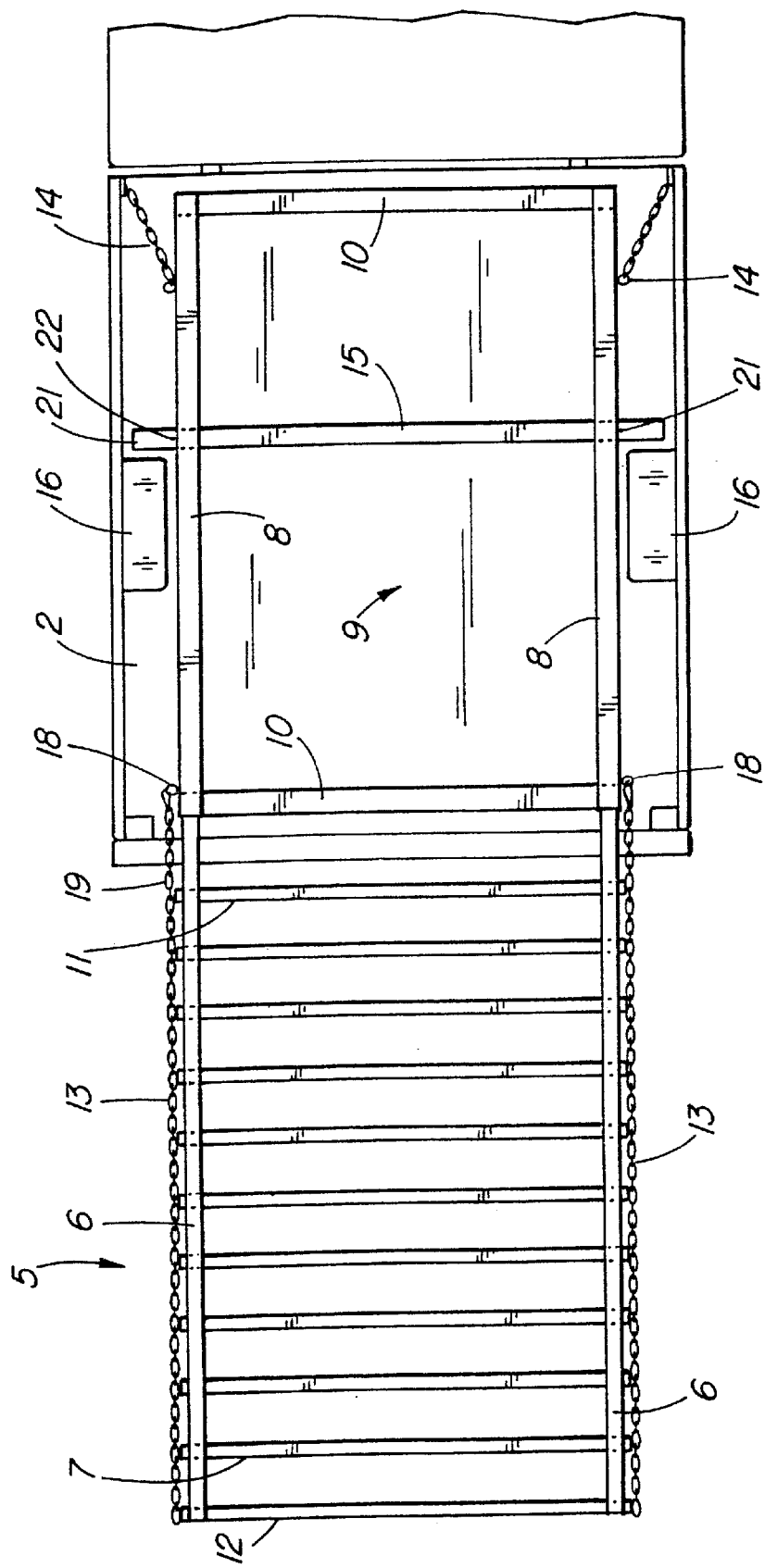
FIG. 3 is a plan view of FIG. 1.

In FIG. 1 a vehicle 1 has a cargo box 2 surmounting wheels 3. At the tailgate end 4 the tailgate (not shown) has been removed. A ramp 5 according to the invention extends downwardly from the box 2 at the tailgate end 4 of the vehicle 1.

The ramp 5 has a pair of stringers 6 and transverse rungs 7A slidably mounted between the stringers 6 by sliding couplings 7. Lengths of chain 13 extend between the rungs 7 limiting their capacity to separate.

Aboard the vehicle 1 a pair of storage tubes 8 are deployed on the floor 9 of the box. These tubes 8 are held in a fixed separated relationship by transverse straps 10. Alternately, the tubes may be fixed to the floor 9 to maintain them in a fixed, preferably parallel, relationship.

The tubes 8 are dimensioned to receive the stringers 6 telescopically as shown in FIG. 2. In this storage mode, the rungs 7 remain on the stringers 6, compactly slid together for storage on a short length of the stringers 6 that protrudes from the tubes.

In FIG. 6 a detail is shown of the ramp 5 extending in deployed position from the storage tubes 8. The rungs 7 are on the lower side of the stringers 6. A chain length 19, coupled to an anchor eye 18 on the adjacent storage tube 8 by a hook, limits the extension of the top rung 11 with respect to the tube 8.

In FIGS. 2 and 6, the rungs 7 are shown stored on the lower side of the stringers 6, in a location where the stringers protrude rearwardly of the tailgate end 4 of the vehicle 1. This is optional. The rungs 7 may also be mounted above the stringers 6, as shown in FIG. 7.

The rungs 7 may be stored rearwardly of the tailgate end 4 of the vehicle, protruding outwardly. The storage tubes 8 may alternately be shortened to allow the stringers 6 and rungs 7 to be lifted entirely within the box 2 during storage.

With the ramp 5 deployed as in FIG. 3, the upper, innermost rung 11 is tethered to the adjacent storage tube 8 by a length of ramp anchor chain 19 that is connected by a detachable hook to the eye 18. The bottom, outermost rung 12 is fixed to the stringers 6. The lengths of rung chain 13 between the rungs 7 are preferably selected to have a total length that prevents the stringers 6 from coming out of the tubes 8. At the same time, the stringers 6 extend sufficiently from the tubes 8 to permit them to be angled downwardly. To facilitate this, the top portions 20 of the tubes 8 may be removed at their tailgate ends, as shown in FIG. 6.

The storage rack portion of the invention, i.e. the tubes 8 and transverse straps 10 may be tethered to the vehicle 1 by rack anchor chains 14. A central transverse anchor strap 15 may be located just forward of the wheel wells 16 surmounting the wheels 3 in the cargo box 2. The outer ends 21 of this anchor-strap 15 extend outwardly from the storage tubes 8 and serve as blocking extensions to engage the wheel wells 16 and prevent the rearward, sliding displacement of the tubes 8 with respect of the box 2.

As a preferred feature, the transverse anchor-strap 15 may be slidable and detachably fastened as by set screws 22 to the storage tubes 8 to allow for individual placement of the anchor-strap 15 adjacent to the wheel wells 16 of particular vehicles 1.

It is preferable that the storage rack not be rigidly fastened to the floor 9 of the cargo box 2 for certain circumstances described below.

In FIG. 1 the ramp 5 is shown as having the stringers 6 uppermost and the rungs 7 underlying the stringers 6. In this configuration, the stringers 6 serve as guide rails to assist in aligning cargo, such as a snowmobile with skiis 24, in mounting the ramp 5.

By reversing the ramp 5 to place the rungs 7 uppermost above the stringers 6 as in FIG. 7, a wider loading surface is provided. The rungs 7 may extend slightly beyond the stringers 6. Optionally, flanges 23 may protrude outwardly from the rung ends, away from the stringers, to serve as guides that delimit the boundary of the ramp 5 and contain the skiis 24 on a snowmobile as shown in FIG. 8.

Figure 4:
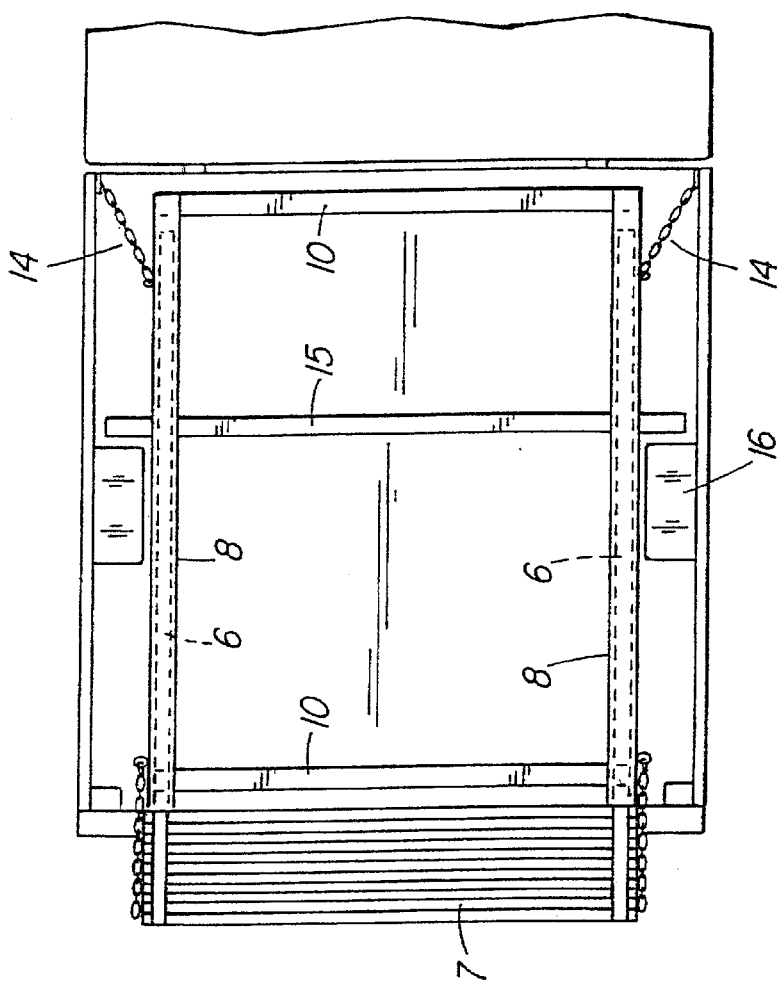
FIG. 4 is a plan view of FIG. 2.

When the rungs 7 are mounted beneath the stringers 6, they may be stored directly at the tailgate end 4 of the vehicle 1, with the stringers 6 protruding from such end 4 as in FIG. 4. With the ramp 5 turned-over to place the rungs 7 uppermost, a wide load, such as a wide snowmobile, may overlie the rungs 7 in their stored location. This could interfere with sliding the rungs 7 directly adjacent to the tailgate end 4 of the vehicle 1. In such case, the load may be raised upwardly, as by a length of lumber used as a lever, to permit the rungs 7 to be slid beneath the load.

An advantage of having the rungs 7 uppermost is that when the ramp 5 is dimensioned for storage completely within the box, the stringers 6 with the rungs 7 on top can be slid into their storage location without substantial interference from the box floor 9. The ramp assembly need only be elevated slightly. With the ramp 5 inverted to place the rungs 7 beneath the stringers 6, it is convenient for the storage tubes 8 to be loosely positioned with respect to the box 2 so that, with the stringers 6 stored inside, the combined ramp assembly can be slightly pried-up at the tailgate end 4 to permit the rungs 7 to be slid into the box 2 adjacent to the box floor 9. This is not required, however, if the rungs 7 are stored on stringer portions that protrude rearwardly from the tailgate end, as in FIG. 4.

The rungs 7 are vulnerable to wear, particularly when snowmobile skiis 24 are slid over their surfaces. To reduce and distribute this wear cylindrical sleeves 25 may be fitted over the rungs. To ensure that a snowmobile track can maintain purchase when driving a snowmobile up the ramp, the sleeves 25 may be mounted in pairs at the outer ends of each rung 7. A retaining flange 26 may be provided to keep the sleeves in place.

Figures 5, 5A:
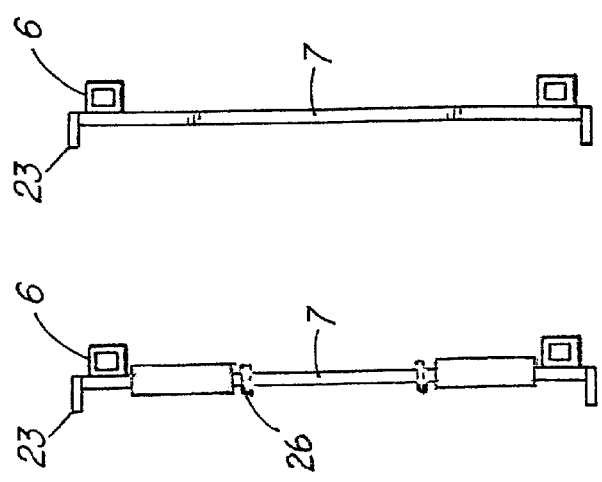
FIG. 5 is an end view of the rungs and stringers of the ramp of FIG. 1 with rungs mounted on the underside of the stringers.
FIG. 5A is an end view of the rungs of the ramp of FIG. 1 modified by the presence of pairs of rotatable cylindrical tubes on each rung to reduce wear on the rungs.
Figure 5B:
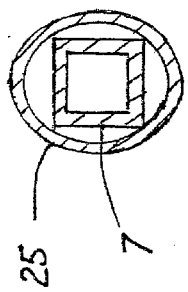
FIG. 5B is a cross-sectional end view of a rung modified as in FIG. 5A.

The sleeves 25 are preferably made of steel and are dimensioned to fit loosely around each rung, as shown in FIG. 5B. From the top side, snowmobile skiis 24 can roll over the sleeves 25. The sleeves 25, in turn, slide over the edges of the rungs 7. This has been found to satisfactorily reduce wear on the rungs 7.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive privilege is claimed are as follows:

1. A ramp system for a vehicle having a load box positioned over rear wheels of the vehicle, such ramp system comprising:

(1) a ramp having two stringers with forward and rearward end portions and multiple transverse rungs extending between the stringers and slidably coupled thereto;

(2) lengths of chain extending between the rungs to limit an inter-rungs spacing when the rungs are separated to provide a ladder-like configuration;

(3) twin storage tubes for telescopically receiving the respective stringers of the ramp, such tubes having forward and rearward ends and being dimensioned to fit longitudinally along a length of a vehicle load box; and (4) separation means for fixing a distance between the twin storage tubes within the vehicle box;

(5) anchor means for limiting an extension of the rungs with respect to the storage tubes;

wherein, upon the telescopic insertion of the forward end portions of the stringers into the respective storage tubes, with the rearward end portions of the stringers protruding from the storage tubes, the rungs may be slid together for compact storage between the rearward end portions of the stringers that remain protruding from the storage tubes.

2. A ramp system as in claim 1 wherein the rungs comprise an innermost rung and an outermost bottom rung and wherein the outermost rung is fixed with respect to the stringers, the ramp system further comprising chain coupling means extending between one of the rungs and at least one of the storage tubes to limit the telescopic extension of the ramp from the storage tubes.

3. A ramp system as in claim 2 wherein the stringers may be telescopically extended from the storage tubes until the stringers are able to be angled-downwardly from such tubes, but without being fully removed therefrom.

4. A ramp system as in claim 1, wherein the rungs all lie on a same side of the two stringers, such rungs being coupled to the stringers so as to allow the ramp to be inverted, permitting either the stringers or rungs to be presented on an uppermost, top side of the ramp.

5. A ramp system as in claim 4 wherein the rungs overlie the sides of the stringers and carry outwardly protruding flanges at their outermost ends, extending away from the stringers, to provide guides for cargo being carried up the ramp when the rungs are presented as the uppermost portion of the ramp.

6. A ramp system as in claim 1 wherein the rungs comprise cylindrical sleeves that permit cargo to be rolled on said sleeves over the rungs.

7. A ramp system as in claim 6 wherein said sleeves are fitted in pairs to the rungs at outmost ends of the rungs.

8. A ramp system as in claim 1 wherein the storage tube separation means comprises a pair of transverse straps extending between the storage tubes at their respective forward and rearward ends on the sides of the storage tubes adjacent to the floor of the vehicle load box.

9. A ramp system as in claim 1 in combination with a vehicle having wheel well covers within the box, comprising a stopping means coupled to the storage tubes that includes blocking extensions having outer ends that extend transversely, outwardly of the sides of the storage tubes, sufficiently to fit against a front side of the wheel well covers present along inner sides of the vehicle box.

10. A ramp system as in claim 9 wherein the stopping means is slidably coupled to the stringers and is adjustably fixable thereto.

* * * * *